United States Patent
Bard et al.

(10) Patent No.: US 11,402,861 B2
(45) Date of Patent: *Aug. 2, 2022

(54) WIRELESS LOAD CONTROL SYSTEM

(71) Applicant: Lutron Technology Company LLC, Coopersburg, PA (US)

(72) Inventors: Benjamin F. Bard, Zionsville, PA (US); David J. Dolan, Coopersburg, PA (US); Timothy Mann, Quakertown, PA (US); Christopher M. Riedl, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,205

(22) Filed: Aug. 10, 2020

(65) Prior Publication Data

US 2021/0055755 A1  Feb. 25, 2021

Related U.S. Application Data

(60) Continuation of application No. 15/852,152, filed on Dec. 22, 2017, now Pat. No. 10,739,805, which is a division of application No. 14/578,602, filed on Dec. 22, 2014, now Pat. No. 9,851,735.

(60) Provisional application No. 61/923,055, filed on Jan. 2, 2014.

(51) Int. Cl.
G05B 15/02 (2006.01)
G05F 1/66 (2006.01)
H04W 4/70 (2018.01)

(52) U.S. Cl.
CPC ............ *G05F 1/66* (2013.01); *G05B 15/02* (2013.01); *H04W 4/70* (2018.02); *G05B 2219/2642* (2013.01)

(58) Field of Classification Search
None
See application file for complete search history.

(56) References Cited

U.S. PATENT DOCUMENTS

| | | |
|---|---|---|
| 4,713,555 A | 12/1987 | Lee |
| 4,864,588 A | 9/1989 | Simpson et al. |
| 5,239,205 A | 8/1993 | Hoffman et al. |
| 5,905,442 A | 5/1999 | Mosebrook et al. |
| 6,803,728 B2 | 10/2004 | Balasubramaniam et al. |

(Continued)

*Primary Examiner* — Jason Lin
(74) *Attorney, Agent, or Firm* — Michael Czarnecki; Glen Farbanish; Philip Smith (57) ABSTRACT

A wireless load control system for controlling one or more electrical loads comprises a wireless control device (e.g., a gateway device) able to obtain a present time from a server via a network (e.g., the Internet), control the electrical loads according to a timeclock schedule, and disable the timeclock schedule if the present time is not able to be obtained from the server via the network. The wireless control device may also be able to obtain the present time from a digital message received from an external device (e.g., a smart phone or a tablet device) via the network. The wireless control device may be configured to receive a control signal indicating a power outage (e.g., from a battery backup device), and to operate in a low-power mode in response to receiving the control signal indicating the power outage.

19 Claims, 6 Drawing Sheets

(56) References Cited

U.S. PATENT DOCUMENTS

| | | | |
|---|---|---|---|
| 6,836,726 B2 * | 12/2004 | Sanchez | H04B 7/18597 |
| | | | 700/214 |
| 6,927,547 B2 | 8/2005 | Waiko, Jr. et al. | |
| 7,123,140 B1 * | 10/2006 | Denes | H05B 47/22 |
| | | | 340/539.1 |
| 7,634,555 B1 * | 12/2009 | Wainscott, Jr. | H04L 67/02 |
| | | | 700/19 |
| 7,755,505 B2 | 7/2010 | Johnson et al. | |
| 7,800,319 B2 | 9/2010 | Raneri | |
| 7,983,115 B2 * | 7/2011 | Ianni | G06F 1/14 |
| | | | 368/46 |
| 8,197,093 B2 | 6/2012 | Veskovic | |
| 8,269,622 B2 | 9/2012 | Chan et al. | |
| 8,306,051 B2 * | 11/2012 | Stocker | H04L 12/403 |
| | | | 370/449 |
| 8,429,435 B1 | 4/2013 | Clayton et al. | |
| 8,823,268 B2 | 9/2014 | Saveri, III et al. | |
| 8,866,343 B2 | 10/2014 | Abraham et al. | |
| 8,901,769 B2 | 12/2014 | Altonen et al. | |
| 9,851,735 B2 | 12/2017 | Bard et al. | |
| 10,739,805 B2 | 8/2020 | Bard et al. | |
| 2008/0191837 A1 * | 8/2008 | Stocker | H05B 47/175 |
| | | | 340/3.51 |
| 2009/0057428 A1 * | 3/2009 | Geadelmann | G05D 23/1905 |
| | | | 236/51 |
| 2010/0135000 A1 * | 6/2010 | Smith, III | F21V 29/50 |
| | | | 362/20 |
| 2010/0225273 A1 * | 9/2010 | Eastlack | H02J 7/02 |
| | | | 320/108 |
| 2010/0238003 A1 * | 9/2010 | Chan | G01D 4/004 |
| | | | 340/538 |
| 2010/0250984 A1 * | 9/2010 | Lee | G09G 5/14 |
| | | | 713/320 |
| 2010/0282460 A1 * | 11/2010 | Stone | E21B 43/247 |
| | | | 700/29 |
| 2011/0163725 A1 * | 7/2011 | Putnam | H02J 7/00036 |
| | | | 320/137 |
| 2011/0196547 A1 * | 8/2011 | Park | H02J 3/14 |
| | | | 700/296 |
| 2011/0224935 A1 * | 9/2011 | Hampel | H04L 9/3297 |
| | | | 702/85 |
| 2012/0287774 A1 * | 11/2012 | Hinkle | H04L 12/5692 |
| | | | 370/216 |
| 2013/0013091 A1 * | 1/2013 | Cavalcanti | H05B 47/19 |
| | | | 700/90 |
| 2013/0030589 A1 | 1/2013 | Pessina et al. | |
| 2013/0091267 A1 | 4/2013 | Urban et al. | |
| 2013/0113284 A1 | 5/2013 | Altonen et al. | |
| 2013/0226357 A1 * | 8/2013 | Ersavas | G05B 19/042 |
| | | | 700/284 |
| 2014/0001977 A1 * | 1/2014 | Zacharchuk | H04B 7/04 |
| | | | 315/291 |
| 2014/0030912 A1 * | 1/2014 | Cohen | H04M 1/04 |
| | | | 439/529 |
| 2014/0052783 A1 | 2/2014 | Swatsky et al. | |
| 2014/0085092 A1 | 3/2014 | Fadell et al. | |
| 2014/0175875 A1 | 6/2014 | Newman, Jr. et al. | |
| 2014/0265881 A1 | 9/2014 | Karc et al. | |
| 2014/0277805 A1 | 9/2014 | Browne, Jr. et al. | |
| 2015/0045947 A1 | 2/2015 | Yau | |

\* cited by examiner

WIRELESS LOAD CONTROL SYSTEM

CROSS-REFERENCE TO RELATED APPLICATIONS

This application is a continuation of U.S. patent application Ser. No. 15/852,152, filed on Dec. 22, 2017, which is a divisional of U.S. patent application Ser. No. 14/578,602, filed Dec. 22, 2014, entitled WIRELESS LOAD CONTROL SYSTEM (now U.S. Pat. No. 9,851,735), which is a non-provisional application of commonly-assigned U.S. Provisional Application No. 61/923,055, filed Jan. 2, 2014, entitled WIRELESS LOAD CONTROL SYSTEM, the entire disclosures of which are hereby incorporated by reference.

BACKGROUND

Field of the Disclosure

The present disclosure relates to a load control system for controlling the amount of power delivered to an electrical load, and more particularly, to a wireless lighting control system for controlling the intensity of one or more lighting loads according to a timeclock schedule.

Description of the Related Art

Home automation systems, which have become increasingly popular, may be used by homeowners to integrate and control multiple electrical and/or electronic devices in their house. For example, a homeowner may connect appliances, lights, blinds, thermostats, cable or satellite boxes, security systems, telecommunication systems, and the like to each other via a wireless network. The homeowner may control these devices using a controller or user interface provided via a phone, a tablet, a computer, and the like directly connected to the network or remotely connected via the Internet. These devices may communicate with each other and the controller to, for example, improve their efficiency, their convenience, and/or their usability.

Some prior art controllers of home automation systems have controlled electrical and/or electrical devices according to timeclock schedules stored in memory in the controllers. Such controllers use timers to keep track of the time of day and year so that the controllers are able to appropriately control the electrical and/or electrical devices at respective event times according to stored timeclock schedules. Typically, such a controller comprises a battery backup to maintain the present time and date in the event of a power loss to the controller. However, batteries are often large and costly and may be difficult to replace. In addition, batteries will eventually run out, at which time, the controller will be unable to maintain the time and date information to then correctly execute the timeclock schedule.

Therefore, there is a need for a controller for a load control system that is able to control electrical loads according to a timeclock schedule without the need for a battery backup.

SUMMARY

As described herein, a method of controlling one or more electrical loads comprises: (1) obtaining a present time from a server via a network (e.g., the Internet); (2) controlling the electrical loads according to a timeclock schedule; and (3) disabling the timeclock schedule if the present time is not able to be obtained from the server via the network. The method may also comprise obtaining the present time from a digital message received from an external device via the network.

In addition, a wireless control device that operates according to a timeclock schedule may comprise a first communication circuit configured to transmit wireless signals, a second communication circuit configured to be electrically coupled to a network (e.g., the Internet), and a control circuit electrically coupled to the first and second communication circuits. The control circuit may be configured to obtain a present time from a server via the second communication circuit, and to transmit digital messages via the first communication circuit at event times of the timeclock schedule. The digital messages may each include a command for controlling at least one electrical load according to the timeclock schedule. The control circuit may be configured to cease transmitting the digital messages at the event times of the timeclock schedule if the present time is not able to be obtained from the server via the network. The wireless control device may further comprise a power supply connector for receiving a supply voltage for powering the control circuit and the first and second communication circuits. The control circuit may be configured to receive a control signal indicating a power outage via the power supply connector, and to operate in a low-power mode in response to receiving the control signal indicating the power outage.

A battery backup device for powering an external device is also described herein. The battery backup device may comprise: (1) an output connector adapted to be coupled to an external device so as to provide power to the external device; (2) a power supply configured to be coupled to a power source and to generate a supply voltage; (3) a battery configured to produce a battery voltage; (4) a first switching circuit configured to be controlled to provide one of the supply voltage and the battery voltage at the output connector; and (5) a control circuit configured to detect a power outage at the power source and to control the first switching circuit to provide the battery voltage at the output connector during the power outage. The control circuit may be configured to generate a control signal indicating that the power outage is presently occurring at the output connector.

DETAILED DESCRIPTION

Figure 1:
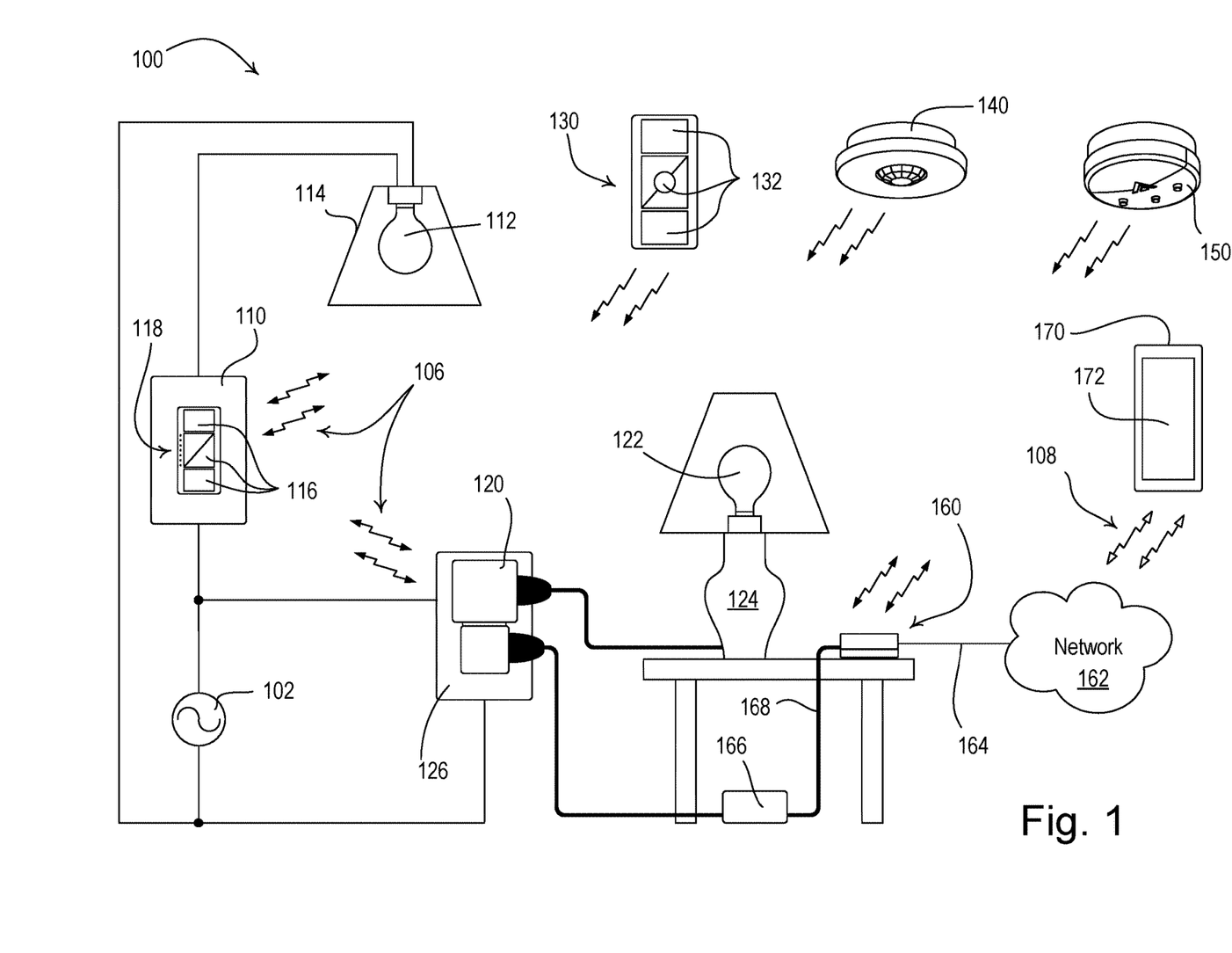
FIG. 1 is a simple diagram of an example load control system for controlling one or more electrical loads.

FIG. 1 is a simple diagram of an example load control system 100 (e.g., a lighting control system) for controlling the amount of power delivered from an alternating-current (AC) power source to one or more electrical loads. The load control system 100 may comprise a first load control device, e.g., a wall-mounted dimmer switch 110, coupled in series electrical connection between the AC power source 102 and a first lighting load, e.g., a first light bulb 112 installed in a ceiling mounted downlight fixture 114. Alternatively, the first light bulb 112 could be installed in a wall-mounted lighting fixture or other lighting fixture mounted to another surface. The dimmer switch 110 may be adapted to be wall-mounted in a standard electrical wallbox. The load control system 100 may also comprise a second load control device, e.g., a plug-in load control device 120, coupled in series electrical connection between the AC power source 102 and a second lighting load, e.g., a second light bulb 122 installed in a lamp (e.g., a table lamp 124). Specifically, the plug-in load control device 120 may be plugged into an electrical receptacle 126 that is powered by the AC power source 102 and the table lamp 124 may be plugged into the plug-in load control device. Alternatively, the second light bulb 122 could be installed in a table lamp or other lamp that may be plugged into the plug-in load control device 120. The plug-in load control device 120 could alternatively be implemented as a table-top load control device or a remotely-mounted load control device.

The dimmer switch 110 may comprise a plurality of actuators 116 (e.g., buttons) for controlling the light bulb 112. In response to actuation of the actuators 116, the dimmer switch 110 may be configured to turn the light bulb 112 on and off, and to increase or decrease the amount of power delivered to the light bulb and thus increase or decrease the intensity of the light bulb from a minimum intensity (e.g., approximately 1%) to a maximum intensity (e.g., approximately 100%). The dimmer switch 110 may further comprise a plurality of visual indicators 118, e.g., light-emitting diodes (LEDs), which are arranged in a linear array and illuminated to provide feedback of the intensity of the light bulb 112. Examples of wall-mounted dimmer switches are described in greater detail in U.S. Pat. No. 5,248,919, issued Sep. 29, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The load control system 100 may further comprise one or more input devices, e.g., RF transmitters, such as a battery-powered remote control device 130, an occupancy sensor 140, or a daylight sensor 150. The dimmer switch 110 and the plug-in load control device 120 are both configured to receive digital messages via wireless signals, e.g., radio-frequency (RF) signals 106, transmitted by the battery-powered remote control device 130, the occupancy sensor 140, or the daylight sensor 150. In response to the received digital messages, the dimmer switch 110 and the plug-in load control device 120 are each configured to turn the respective light bulb 112, 122 on and off, and to increase or decrease the intensity of the respective light bulb. The dimmer switch 110 and the plug-in load control device 120 may both alternatively be implemented as electronic switches configured to only turn on and off the respective light bulbs 112, 122.

The remote control device 130 may comprise one or more actuators 132 (e.g., one or more of an on button, an off button, a raise button, a lower button, and a preset button). The remote control device 130 may be a handheld remote control. Alternatively, the remote control device 130 could be mounted vertically to a wall or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 12, 2012, entitled CONTROL DEVICE HAVING A NIGHTLIGHT, the entire disclosures of which are hereby incorporated by reference.

The remote control device 130 may transmit RF signals 106 in response to actuations of one or more of the actuators 132. For example, the RF signals 106 may be transmitted using a proprietary RF protocol, such as the ClearConnect® protocol, or a standard protocol, such as ZIGBEE, Z-WAVE, and KNX-RF protocols. In addition, the RF signals 106 may be transmitted, for example, using a standard wireless technology, for example, one of Wi-Fi, Bluetooth, and Near Field Communication (NFC) technologies. All digital messages transmitted by the remote control device 130 may include a command and identifying information, for example, a serial number (e.g., a unique identifier) associated with the remote control device. The remote control device 130 may be assigned to the dimmer switch 110 and/or the plug-in load control device 120 during a configuration procedure of the load control system 100, such that the dimmer switch 110 and/or the plug-in load control device 120 are responsive to digital messages transmitted by the remote control device 130 via the RF signals 106. Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM, and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The occupancy sensor 140 may be configured to detect occupancy and vacancy conditions in the space in which the load control system 100 is installed. The occupancy sensor 140 may transmit digital messages to the dimmer switch 110 and/or the plug-in load control device 120 via the RF signals 106 in response to detecting the occupancy or vacancy conditions. The dimmer switch 110 and/or the plug-in load control device 120 may each be configured to turn on the respective light bulb 112, 122 in response to receiving an occupied command, and to turn off the respective light bulb in response to receiving a vacant command. Alternatively, the occupancy sensor 140 may operate as a vacancy sensor to only turn off the lighting loads in response to detecting a vacancy condition (e.g., to not turn on the light bulbs 112, 122 in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 150 may be configured to measure a total light intensity in the space in which the load control system is installed. The daylight sensor 150 may transmit digital messages including the measured light intensity to the dimmer switch 110 and/or the plug-in load control device 120 via the RF signals 106 for controlling the intensities of the respective light bulbs 112, 122 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 100 may further comprise a gateway device 160 (e.g., a bridge) configured to enable communication with a network 162, e.g., a wireless or wired local area network (LAN). The gateway device 160 may be connected to a router (not shown) via a wired digital communication link 164 (e.g., an Ethernet communication link). The router may allow for communication with the network 162, e.g., for access to the Internet. Alternatively, the gateway device 160 may be wirelessly connected to the network 162, e.g., using Wi-Fi technology.

The gateway device 160 may be configured to transmit RF signals 106 to the dimmer switch 110 and/or the plug-in load control device 120 (e.g., using the proprietary protocol) for controlling the respective light bulbs 112, 122 in response to digital messages received from external devices via the network 162. The gateway device 160 may be configured to receive RF signals 106 from the dimmer switch 110, the plug-in load control device 120, the remote control device 130, the occupancy sensor 140, and/or the daylight sensor 150, and to transmit digital messages via the network 162 for providing data (e.g., status information) to external devices. The gateway device 160 may operate as a central controller for the load control system 100, or may simply relay digital messages between the control devices of the load control system and the network 162.

The load control system 100 may further comprise a network device 170, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device (for example, an iPad® hand-held computing device), a Wi-Fi or wireless-communication-capable television, or any other suitable Internet-Protocol-enabled device. The network device 170 may be operable to transmit digital messages in one or more Internet Protocol packets to the gateway device 160 via RF signals 108 either directly or via the network 162. For example, the network device 170 may transmit the RF signals 108 to the gateway device 160 via a Wi-Fi communication link, a Wi-MAX communications link, a Bluetooth® communications link, a near field communication (NFC) link, a cellular communications link, a television white space (TVWS) communication link, or any combination thereof. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 170 may have a visual display 172, which may comprise a touch screen having, for example, a capacitive touch pad displaced overtop the visual display, such that the visual display may display soft buttons that may be actuated by a user. The network device 170 may comprise a plurality of hard buttons, e.g., physical buttons (not shown), in addition to the visual display 172. The network device 170 may download a product control application for allowing a user of the network device to control the lighting control system 100. In response to actuations of the displayed soft buttons or hard buttons, the network device 170 may transmit digital messages to the gateway device 160 through the wireless communications described herein. The network device 170 may transmit digital messages to the gateway device 160 via the RF signals 108 for controlling the dimmer switch 110 and/or the plug-in load control device 120. The gateway device 160 may be configured to transmit RF signals 108 to the network device 170 in response to digital messages received from the dimmer switch 110, the plug-in load control device 120, the remote control device 130, the occupancy sensor 140, and/or the daylight sensor 150 (e.g., using the proprietary protocol) for displaying data (e.g., status information) on the visual display 172 of the network device.

The operation of the load control system 100 may be programmed and configured using the network device 170. An example of a configuration procedure for a wireless load control system is described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

The gateway device 160 may also be configured to transmit digital messages to the dimmer switch 110 and/or the plug-in load control device 120 for controlling the respective light bulbs 112, 122 according to a timeclock schedule, which may be stored in a memory in the gateway device. For example, the gateway device 160 may comprise an astronomical timeclock for determining the sunrise and sunset times of each day of the year. The timeclock schedule may include a number of timeclock events, each having an event time and a corresponding command or preset. The gateway device 160 may be configured to keep track of the present time and day and to transmit the appropriate command or preset at the respective event time of each timeclock event.

The gateway device 160 may be configured to obtain the present time and date from the Internet via the network 162, e.g., by communicating with a time server, such as, the National Institute of Standards and Technology server, which has a Domain Name System (DNS) address of time.nst.gov. For example, the gateway device 160 may obtain the present time and date when the gateway device is first powered on or reset, and may re-synchronize the time and day periodically, e.g., each night. The gateway device 160 may also be configured to obtain the present time and date from the network device 170. For example, the network device 170 may be configured to transmit the present time and date to the gateway device 160 via the RF signals 108 whenever a user logs into the product control application running on the network device.

The gateway device 160 may not have an internal battery backup for maintaining the present time and date, but may re-synchronize the present time and date as discussed above. If the gateway device 160 "loses" the present time and date, the gateway device is configured to disable the timeclock schedule. For example, the gateway device 160 may lose the present time and date if the gateway device 160 is reset and the connection to the Internet via the network 162 is not available. When the gateway device 160 is able to obtain the present time and date once again (e.g., via the Internet or the network device 170), the gateway device may be configured to enable the timeclock schedule.

In addition, the gateway device 160 may be configured to obtain the location of the gateway device (e.g., the location of the building in which the load control system 100 is installed) from the network device 170). For example, the network device 170 may determine the location of the network device (e.g., longitude and latitude information) using, for example, a global positioning system (GPS)

receiver. The network device 170 may then transmit the location information to the gateway device 160 via the RF signals 108 whenever a user logs into the product control application running on the network device. The gateway device 160 may be configured to use the location information to determine the appropriate sunrise and sunset times for the astronomical timeclock and/or the time zone (e.g., daylight savings time information) at the location of the specified longitude and latitude. Further, since the network device 170 may be capable of remotely logging into the gateway device 160 via the network 162 (e.g., via a cellular communications link when then network device is not located in the building in which the load control system 100 is installed), the gateway device may be optionally configured to confirm that the location of the network device is the same as the location stored in the gateway device prior to obtaining the present time and date from the network device.

The load control system 100 may also comprise an optional external battery pack 166 for the gateway device 160 to provide a battery backup, e.g., for maintaining the present time and date in the event of a power outage. The battery pack 166 may be coupled to the gateway device 166, for example, via a micro-USB power cord 168. The battery pack 166 may be plugged into the electrical receptacle 126 (that is powered by the AC power source 102) and may comprise a power supply for generating a supply voltage for powering the gateway device 160 during normal conditions. The battery pack 166 may also comprise a battery for powering the gateway device 160 in the event of a power outage. The battery pack 166 may be configured to detect a power outage and may switch to the battery for powering the gateway device 160. In addition, the battery pack 166 may be configured to signal to the gateway device 160 that there is a power outage (e.g., via the data lines of the micro-USB power cord 168), and the gateway device 160 may be configured to go into a low-power mode so as to not drain the battery of the battery pack 166 too fast.

Alternatively, the load control devices of the load control system 100 (e.g., the dimmer switch 110 and the plug-in load control device 120) could each be configured to store a timeclock schedule for controlling the respective light bulb 112, 122. The dimmer switch 110 and the plug-in load control device 120 may each be configured to obtain the present time and date from the Internet via the network 162 in a similar manner as the gateway device 160 as described above. For example, the dimmer switch 110 and the plug-in load control device 120 may each be configured to directly connect to the network 162 (e.g., using Wi-Fi technology) to obtain the present time and ate or may be configured to receive the present time and date from the gateway device 160. In addition, the dimmer switch 110 and the plug-in load control device 120 may each be configured to obtain the present time and date from the network device 170. The dimmer switch 110 and the plug-in load control device 120 may not comprise battery backup for maintaining the present time and date in the event of a power outage. Accordingly, if the present time and date is lost, the dimmer switch 110 and the plug-in load control device 120 may each be configured to disable the respective timeclock schedule in a manner similar to that of the gateway device 160 as described above.

The load control system 100 may comprise one or more other types of load control devices, such as, for example, a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

In addition, the load control system 100 may comprise other types of input device, such as, for example, temperature sensors, humidity sensors, radiometers, cloudy-day sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices, power monitoring devices (such as power meters, energy meters, utility submeters, utility rate meters), central control transmitters, residential, commercial, or industrial controllers, or any combination of these input devices.

Figure 2:
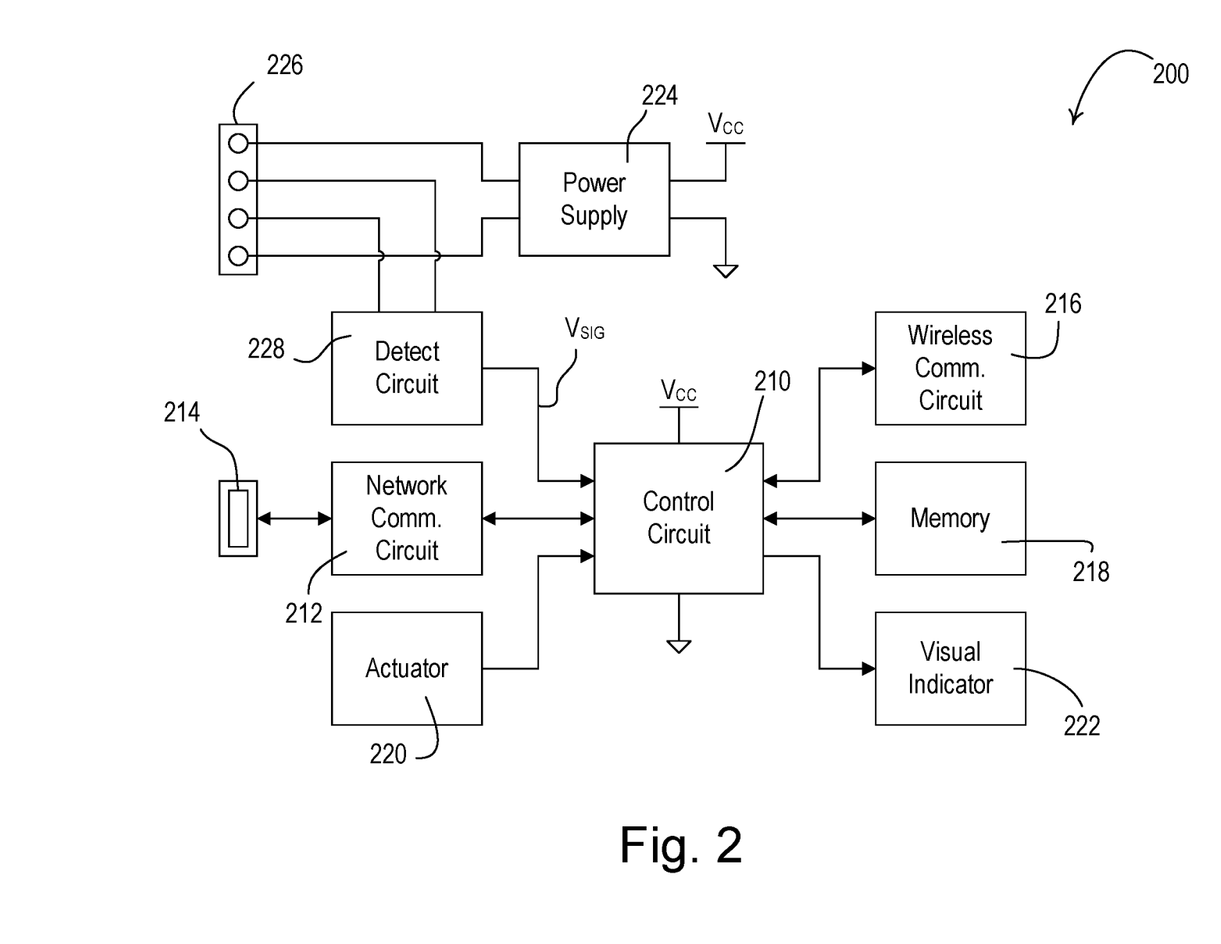
FIG. 2 is a simplified block diagram of an example wireless control device.

FIG. 2 is a simplified block diagram of an example wireless control device, e.g., a gateway device 200, which may be deployed as, for example, the gateway device 160 of the load control system 100 shown in FIG. 1. The gateway device 200 may comprise a control circuit 210, which may include one or more of a processor (e.g., a microprocessor), a microcontroller, a programmable logic device (PLD), a field programmable gate array (FPGA), an application specific integrated circuit (ASIC), or any suitable processing device. The gateway device 200 may comprise a network communication circuit 212 coupled to a network connector 214 (e.g., an Ethernet jack), which is adapted to be connected to a wired digital communication link (e.g., an Ethernet communication link) for allowing the control circuit 210 to communicate with network devices on a network (e.g., a local area network, such as the network 162 shown in FIG. 1). Alternatively, the network communication circuit 212 may be configured to be wirelessly connected to the network, e.g., using Wi-Fi technology to transmit and receive RF signals (e.g., the RF signals 108 shown in FIG. 1).

The gateway device 200 further comprises a wireless communication circuit 216, for example, including an RF transceiver coupled to an antenna for transmitting and receiving RF signals (e.g., the RF signals 106 shown in FIG. 1) using a proprietary protocol (e.g., the ClearConnect® protocol). The control circuit 210 may be coupled to the wireless communication circuit 216 for transmitting digital messages via the RF signals 106, for example, to control the dimmer switch 110 and/or the plug-in load control device 120 in response to digital messages received via the network communication circuit 212. The control circuit 210 may also be configured to receive digital messages from, for example, the dimmer switch 110, the plug-in load control device 120, the remote control device 130, the occupancy sensor 140, and/or the daylight sensor 150. For example, the control circuit 210 may be operable to receive a digital message including the intensity of a lighting load (e.g., one of the light bulbs 112, 122 of the load control system 100 shown in FIG. 1), and to transmit a digital message including the intensity of the lighting load to the network device 170, e.g., for displaying the intensity on the visual display 172.

The control circuit 210 may comprise a timer for enabling the control circuit to transmit digital messages for controlling electrical loads according to a timeclock schedule. For example, the control circuit 210 may operate an astronomical timeclock for determining the sunrise and sunset times of each day of the year. The control circuit 210 may be coupled to a memory 218 for storage of the timeclock schedule. The memory 218 may be implemented as an external integrated circuit (IC) or as an internal circuit of the control circuit 210. The control circuit 210 may keep track of the present time and day and transmit the appropriate command or preset at one or more event times of the timeclock schedule. The control circuit 210 may communicate via the network communication circuit 212 to obtain the present time and date from the Internet, e.g., from a time server. For example, the control circuit 210 may be configured to obtain the present time and date when the gateway device is first powered on or reset, and may re-synchronize the time and day periodically, e.g., each night. The control circuit 210 may also be configured to obtain the present time and date from a digital message received via the network communication circuit 212 from a network device (e.g., the network device 170 shown in FIG. 1). The control circuit 210 may also be configured to obtain the location (e.g., longitude and latitude information) of the gateway device 200 from the network device.

The gateway device 200 may not have a battery backup for maintaining the present time and date in the memory 218. If the control circuit 210 loses the present time and date, the control circuit may be configured to disable the timeclock schedule. When the timeclock schedule is disabled, the control circuit may not transmit commands at the event times according the timeclock schedule. For example, the control circuit 200 may lose the present time and date if the connection to the Internet is not available and the control circuit is reset. If the control circuit 200 loses the Internet connection without being reset, the control circuit 200 may not be able to re-synchronize the time and date nightly via the Internet, but may be able keep track of the time using the internal timer. However, if the Internet connection is down for a long period of time, the accuracy of the timer may drift, such that the present time used by the control circuit 200 may drift from the actual time (e.g., the time that would be determined from the time server via the Internet). For example, the time used by the control circuit 200 may drift up to approximately 1.2 minutes per month without re-synchronizing the time and date.

The control circuit 210 may be configured to disable the timeclock before the time drifts by a predetermined maximum $T_{DRIFT-MAX}$ (e.g., approximately 2 minutes). After losing the Internet connection without being reset, the control circuit 210 may attempt to obtain the present time and date from the Internet, for example, every four minutes. The control circuit 210 may wait for an Internet timeout period $T_{TIMEOUT}$ before disabling the timeclock, such that the time used by the control circuit does not drift by more than the predetermined maximum $T_{DRIFT-MAX}$ while the Internet connection is down. For example, the Internet timeout period $T_{TIMEOUT}$ may be approximately 40 hours, but could be as long as six months depending on the accuracy of the timeclock. If the control circuit 210 is able to obtain the present time and date from a digital message received from a network device (e.g., the network device 170) before the end of the Internet timeout period $T_{TIMEOUT}$, the control circuit may re-synchronize the time and begin the Internet timeout period $T_{TIMEOUT}$ once again. At the end of the Internet timeout period $T_{TIMEOUT}$, the control circuit may disable the timeclock schedule. When the control circuit 210 is able to obtain the present time and date once again (e.g., via the Internet or the network device 170), the control circuit may enable the timeclock schedule, and may once again transmit the appropriate commands at the event times of the timeclock schedule.

The control circuit 210 may be responsive to an actuator 220 for receiving a user input. For example, the control circuit 210 may be operable to associate the gateway device 200 with one or more control devices of the load control system 100 in response to actuations of the actuator 220 during a configuration procedure of the load control system. The control circuit 210 may store the serial numbers of the control devices to which the gateway device 200 is associated in the memory 218. The gateway device 200 may comprise additional actuators to which the control circuit 210 is responsive.

The control circuit 210 may illuminate a visual indicator 222 to provide feedback to a user of the load control system. For example, the control circuit 210 may blink or strobe the visual indicator 222 to indicate a fault condition. In addition, the control circuit 210 may be operable to illuminate the visual indicator 222 different colors to indicator different conditions or states of the gateway device 200. The visual indicator 420 may be illuminated by, for example, one or more light-emitting diodes (LEDs). Alternatively, the gateway device 400 may comprise more than one visual indicator.

The gateway device 200 may further comprise a power supply 224 for generating a DC supply voltage $V_{CC}$ for powering the control circuit 210, the network communication circuit 212, the wireless communication circuit 216, the memory 218, and other circuitry of the gateway device. The power supply 224 may be coupled to a power supply connector 226 (e.g., a micro-USB port) for receiving a supply voltage (e.g., a DC voltage) and for drawing current from an external power source (e.g., the battery pack 166).

The gateway device 200 may also comprise a detect circuit 228 coupled to the power supply connector 226, e.g., to the data lines of the micro-USB port, for receiving a control signal from an external device (e.g., the battery pack 166). For example, the detect circuit 228 may be configured to provide a control signal $V_{SIG}$ to the control circuit 210 that indicates a power outage. Alternatively, the control circuit 210 may be directly coupled to the data lines of the power supply connector 226 for receiving a control signal indicating a power outage. For example, the external device may be configured to switch an impedance in series between the data lines of the power supply connector 226 during the power outage and the detect circuit may be configured to detect the impedance. The control circuit 210 may be configured to go into a low-power mode in response to receiving the control signal $V_{SIG}$ indicating the power outage. The control circuit 210 may be configured to adjust the operation of the gateway device 200 to draw less power through the power supply connector 226 in the low-power mode. For example, in the low-power mode, the control circuit 210 may be configured to turn off or dim the visual indicator 222, minimize the number of digital messages transmitted by the wireless communication circuit 216, and/or put the control circuit 210 and/or the wireless communication circuit 216 in a sleep mode.

Figure 3:
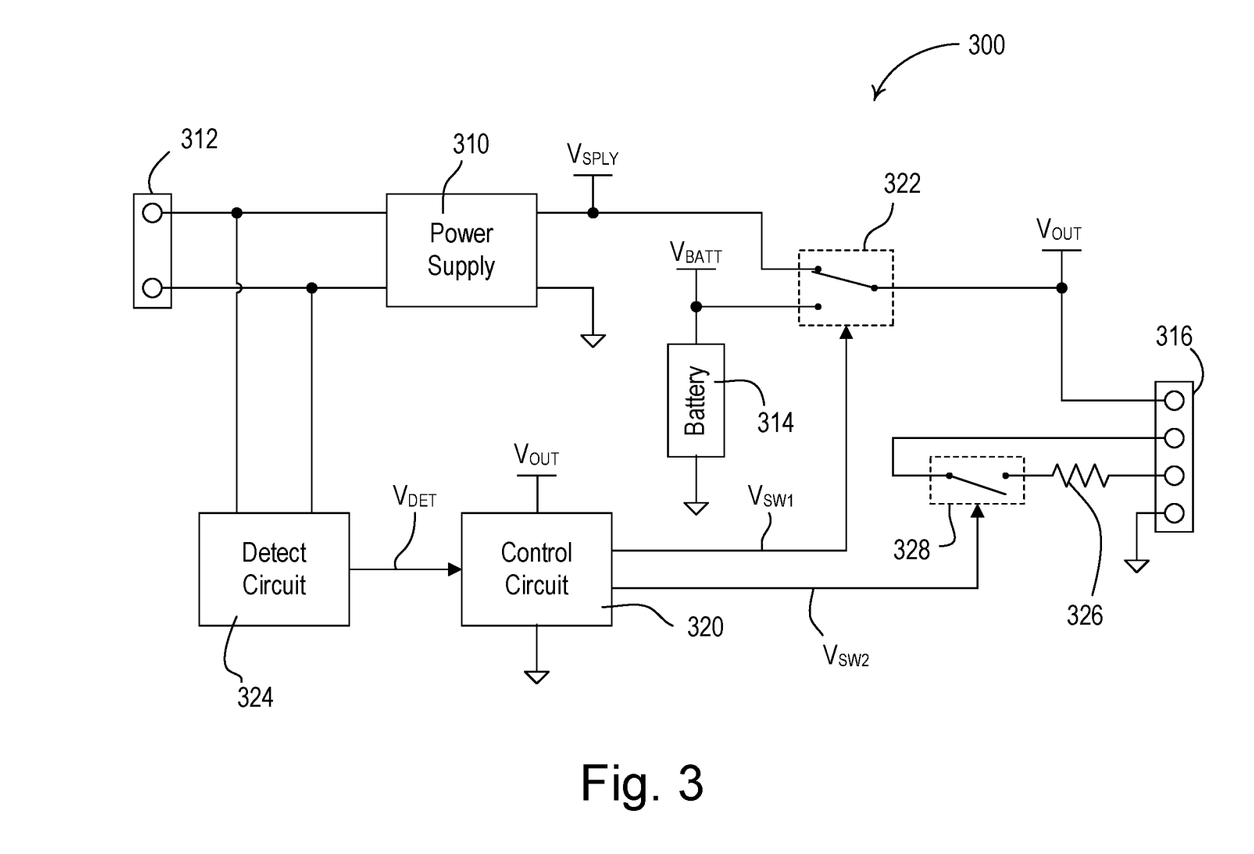
FIG. 3 is a simplified block diagram of an example battery backup device.

FIG. 3 is a simplified block diagram of an example battery backup device 300, which may be deployed as, for example, the battery pack 166 of the load control system 100 shown in FIG. 1. The battery backup device 300 may provide power to an external device, such as the gateway device 160 of the load control system 100 of FIG. 1 and/or the gateway device 200 of FIG. 2. The battery backup device 300 may comprise a power supply 310 adapted to coupled to an external power source (e.g., the AC power source 102) via a power connector 312 (e.g., an electrical cord plugged into an electrical receptacle). The power supply 310 may be configured to generate a supply voltage $V_{SPLY}$ (e.g., approximately 5 volts). The battery backup device 300 may also comprise a battery 314 configured to generate a battery voltage $V_{BATT}$ (e.g., approximately 5 volts). The battery backup device 300 may comprise an output connector 316 (e.g., a USB port) adapted to be coupled to a micro-USB power cord (e.g., the micro-USB power cord 168). The output connector 316 may provide an output voltage $V_{OUT}$ to the external device, where the output voltage is one of supply voltage $V_{SPLY}$ and the battery voltage $V_{BATT}$ as will be described below.

The battery backup device 300 may comprise a control circuit 320, which may be an analog control circuit or may including one or more of a processor (e.g., a microprocessor), a microcontroller, a programmable logic device (PLD), a field programmable gate array (FPGA), an application specific integrated circuit (ASIC), or any suitable processing device. The battery backup device 300 may comprise a first switching circuit 322, e.g., a single-pole double-throw (SPDT) relay, for controllably selecting one of the supply voltage $V_{SPLY}$ and the battery voltage $V_{BATT}$ to be provided to the output connector 316 for powering the external device. The battery backup device 300 may also comprise a detect circuit 324 coupled to the power connector 312 and configured to generate a detect signal $V_{DET}$ indicating a power outage. The control circuit 320 may be configured to generate a first switch control signal $V_{SW1}$ for controlling the switching circuit 322 in response to the detect signal $V_{DET}$. For example, the control circuit 320 may be configured to control the switching circuit 322 to couple the supply voltage $V_{SPLY}$ to the output connector 316 during normal conditions and to couple the battery voltage $V_{BATT}$ to the output connector 316 during a power outage.

The control circuit 320 may also be configured to signal to the external device to indicate that the power outage is presently occurring. For example, the control circuit 320 may be configured to generate a control signal by switching an impedance in series between data terminals of the output connector 316 (e.g., the data lines of the micro-USB power cord) during the power outage. The battery backup device 300 may comprise an impedance (e.g., a resistor 326) electrically coupled in series with a second switching circuit 328 between the data terminals of the output connector 316. The control circuit 320 may be configured to generate a second switch control signal $V_{SW2}$ for rendering the second switching circuit 328 (e.g., a transistor) conductive to switch the resistor 326 in series between the data terminals of the output connector 316 during the power outage. Alternatively, the control circuit 320 could be directly coupled to the data terminals of the output connector 316 to generate a control signal for indicating the power outage to the external device. For example, the control circuit 320 may be configured to transmit a digital message to the external device via the data lines of the micro-USB power cord.

Figure 4:
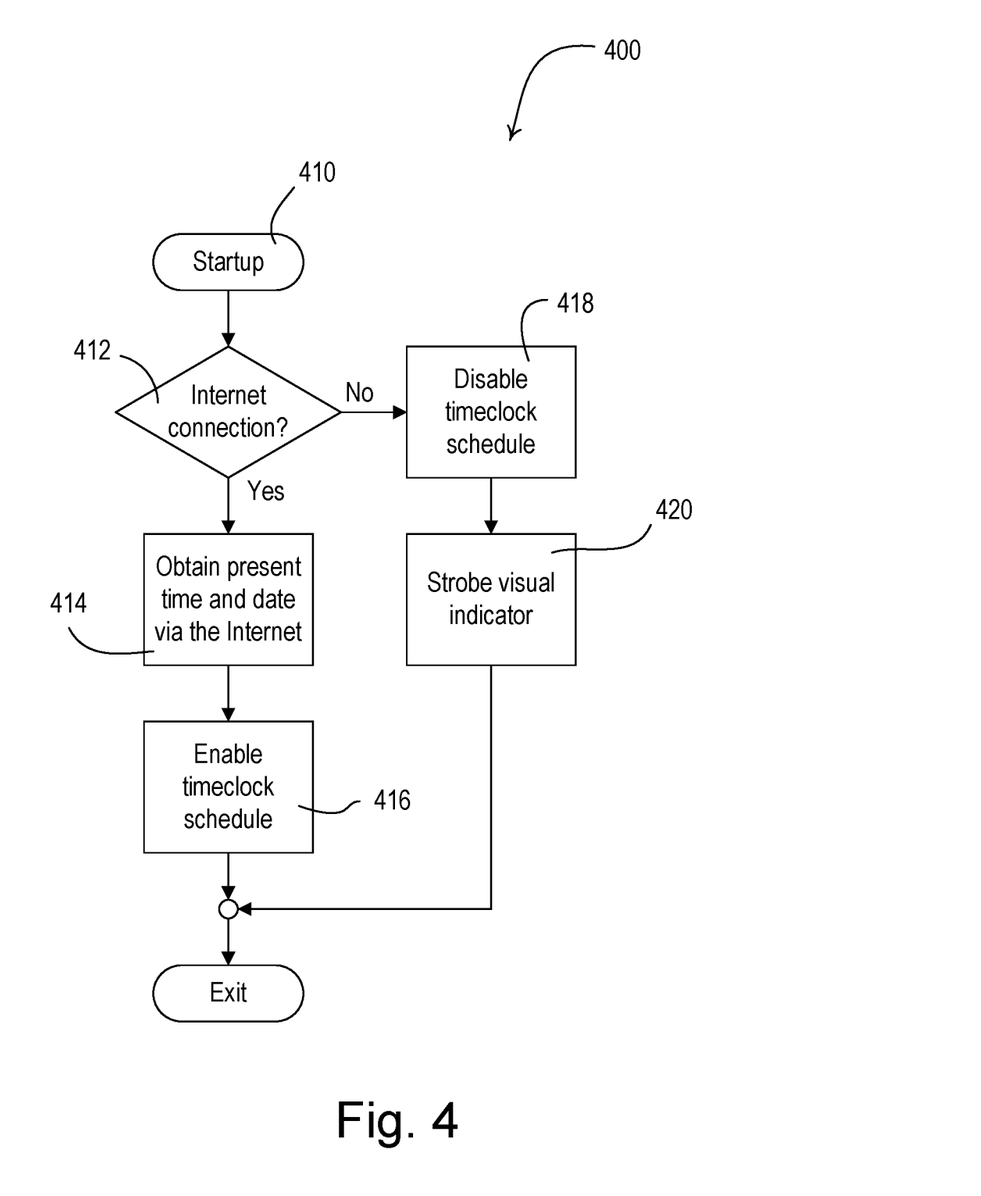
FIGS. 4-6 are simplified flowcharts of procedures executed by a control circuit of a wireless control device to enable and disable a timeclock schedule.
Figure 5:
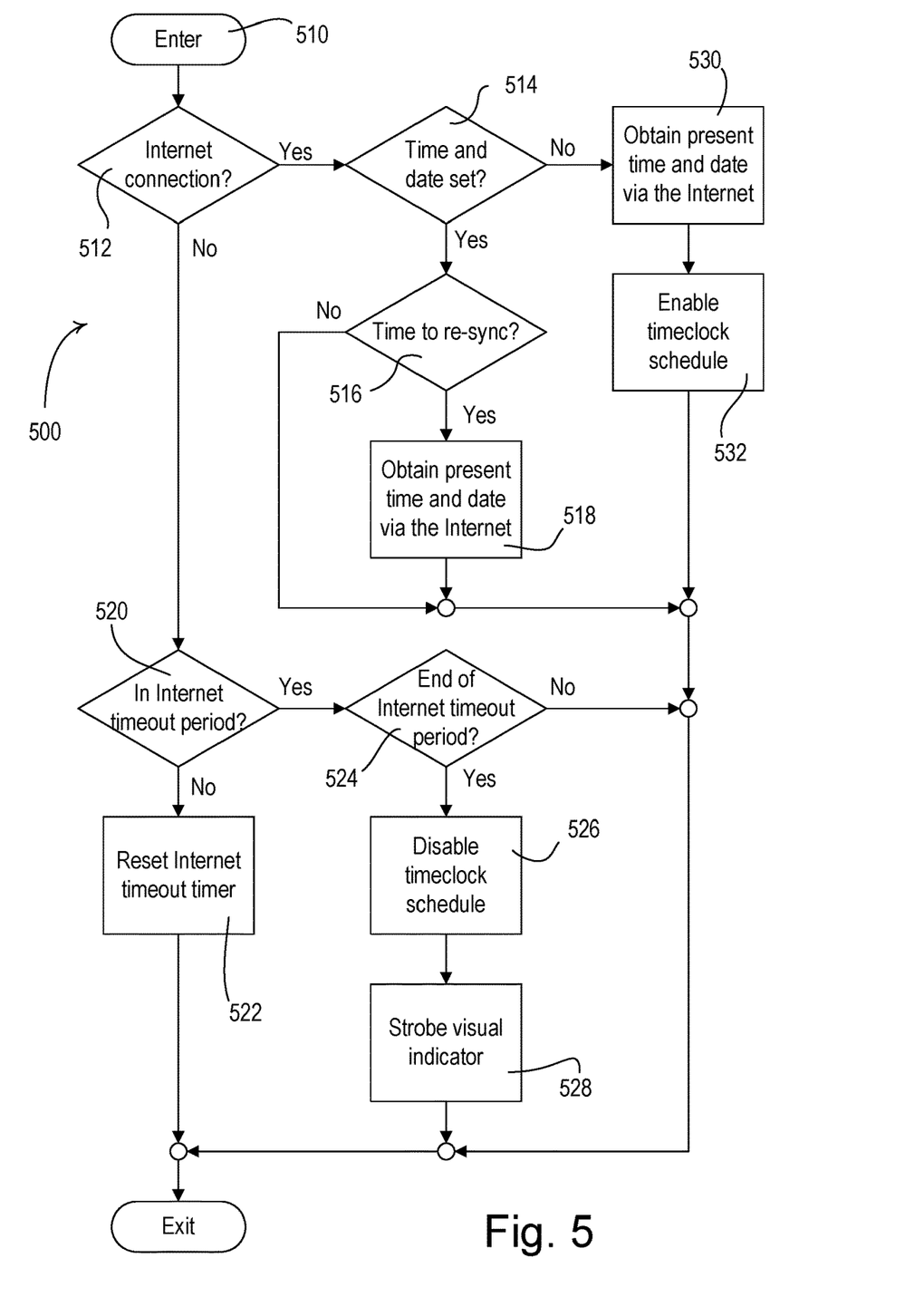
Figure 6:
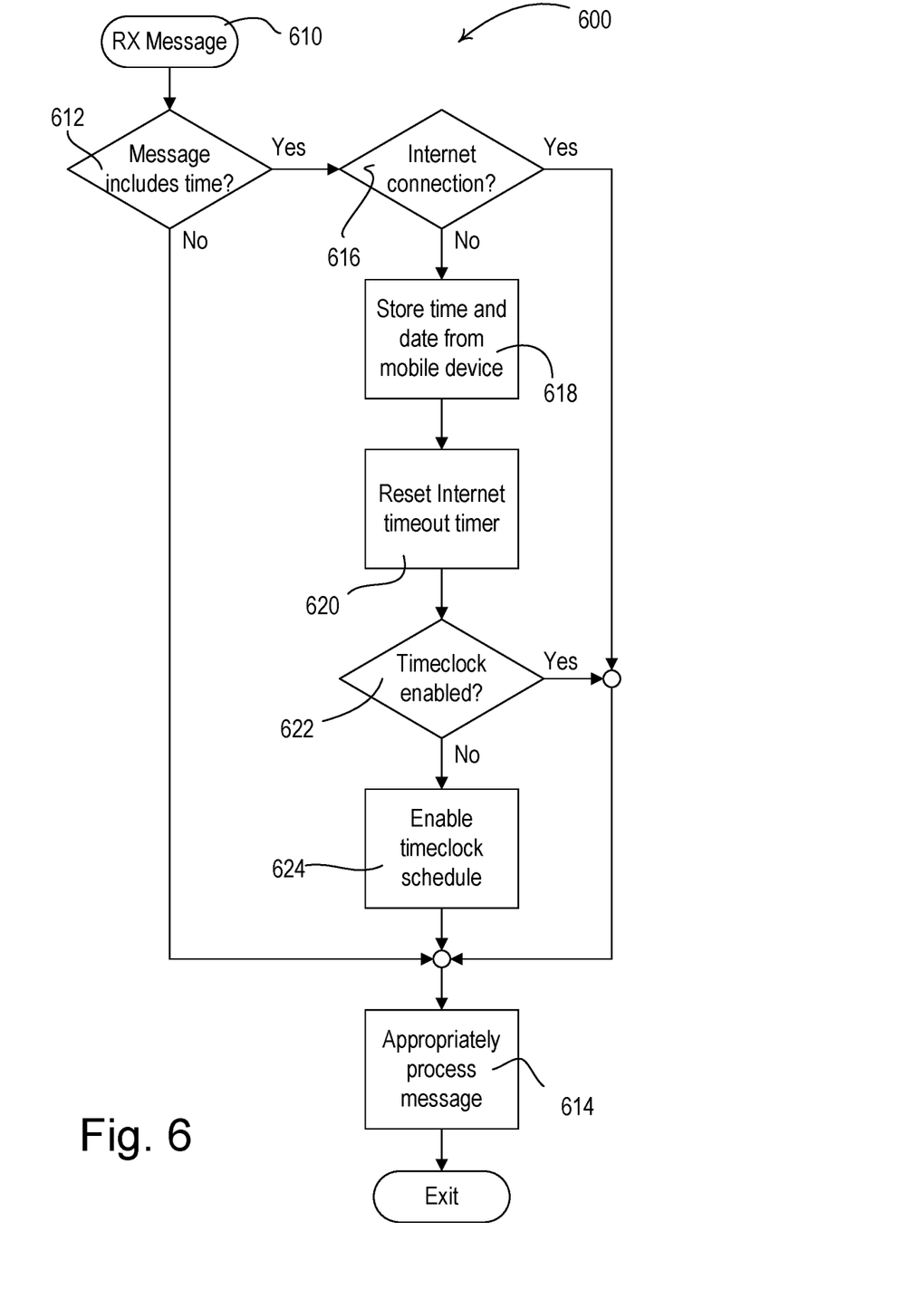

FIGS. 4-6 are simplified flowcharts of procedures executed by a control circuit of a wireless control device (e.g., the control circuit 210 of the gateway device 200 shown in FIG. 2) to enable and disable a timeclock schedule. FIG. 4 is a simplified flowchart of an example startup procedure 400 executed by the control circuit, for example, when the control circuit is first powered on or reset at step 410. If an Internet connection is available at step 412, the control circuit may obtain the present time and date via the Internet, e.g., from a time server, at step 414 and enable the timeclock schedule at step 416, before the startup procedure 400 exits. If the Internet connection is not available at step 412, the control circuit may disable the timeclock schedule at step 418 and begin to blink or strobe a visual indicator (e.g., the visual indicator 222) at step 420, before the startup procedure 400 exits.

FIG. 5 is a simplified flowchart of a timeclock maintenance procedure 500, which may be executed by the control circuit periodically at step 510, e.g., once every 24 hours, such as every day at midnight. If the Internet connection is available at step 512 and the time and date is set at step 514, the control circuit may determine if it is time to re-synchronize the time and date (e.g., if the present time is midnight) at step 516. If it is time to re-synchronize the time and date at step 516, the control circuit may obtain the present time and date via the Internet, e.g., from a time server, at step 518, and the timeclock maintenance procedure 500 may exit.

If the Internet connection is not available at step 512, the control circuit may determine if an Internet timeout period is active at step 520. If not, the control circuit may start the Internet timeout period by resetting an Internet timeout timer at step 522, before the timeclock maintenance procedure 500 exits. The Internet timeout timer will expire at the end of the Internet timeout period (e.g., approximately 40 hours). If the Internet timeout period is active at step 520 (e.g., the Internet timeout timer is actively counting down), the control circuit may determine if the end of the Internet timeout period has been reached at step 524. If so, the control circuit may disable the timeclock schedule at step 526 and begin to blink or strobe the visual indicator at step 528, before the timeclock maintenance procedure 500 exits. When the Internet connection is available at step 512 and the time and date are not set at step 514, the control circuit may obtain the present time and date via the Internet at step 530 and enable the timeclock schedule at step 532, before the timeclock maintenance procedure 500 exits.

FIG. 6 is a simplified flowchart of a message receiving procedure 500, which may be executed by the control circuit at step 610, for example, when the control circuit receives a digital message from a network (e.g., via the network communication circuit 212). If the received digital message does not include the present time and date at step 612, the control circuit may process the digital message appropriately at step 614, and the message receiving procedure 600 may exit. If the received digital message includes the present time and date at step 612 and the Internet connection is available at step 616, the control circuit may process the digital message at step 614 and the message receiving procedure 600 may exit. If the Internet connection is not available at step 616, the control circuit may store the time and date from the digital message in memory at step 618 and reset the Internet timeout timer at step 620. If the timeclock is not enabled at step 622, the control circuit may enable the timeclock schedule at step 624 and process the digital message at step 614, before the message receiving procedure 600 exits.

What is claimed is:

1. A method of controlling an electrical load, the method comprising:
   storing a timeclock schedule in memory;
   maintain a time of day;
   based at least in part on the maintained time of day, transmitting messages at event times of a timeclock schedule, each message including a command for controlling the electrical load according to the timeclock schedule;
   attempting to obtain a present time from a server in order to re-synchronize the maintained time of day;
   determining that the present time is not obtainable from the server;
   in response to determining that the present time is not obtainable from the server, disabling the timeclock schedule, wherein disabling the timeclock schedule comprises not transmitting messages for controlling the electrical load at the event times of the timeclock schedule so that the electrical load is not controlled according to the timeclock schedule.

2. The method of claim 1, wherein storing a timeclock schedule in memory further comprises storing the timeclock schedule in memory on a control device of a load control system.

3. The method of claim 2, further comprising: receiving an indication of an actuation of a button at an external device; based at least in part on receiving the indication of the actuation of the button, instructing the load control device to control the at least one electrical load; obtaining a present time from a first message received from the external device; and based at least in part on obtaining the present time from the first message received from the external device, re-synchronizing the maintained time and re-enable the time clock schedule.

4. The apparatus of claim 3, further comprising: storing a geographical location of the control device in the memory; obtaining a geographical location of the external device from a second message received from the external device; determining that the geographical location of the external device is the same as the geographical location of the control device stored in the memory; and based at least in part on determining that the geographical location of the external device is the same as the geographical location stored in the memory, re-enable the time clock schedule.

5. The method of claim 4, further comprising: obtaining a location of the external device from a second digital message received from the external device via the second communication circuit; storing the location in a memory; and subsequently confirming that a location of the external device is the same as the location stored in the memory.

6. The method of claim 2, further comprising: obtaining, by the control device, a present time from a first digital message received from an external device.

7. The method of claim 2, wherein attempting to obtain a present time from a server further comprises attempting, by the control device, to obtain the present time when the control device is powered on in order to re-synchronize the maintained time of day.

8. The method of claim 2, wherein attempting to obtain a present time from a server further comprises attempting, by a control circuit of the control device, to obtain the present time when the control circuit is reset in order to re-synchronize the maintained time of day.

9. The method of claim 2, wherein transmitting messages at event times of a timeclock schedule further comprises: transmitting, by the control device, messages to a load control device of the load control system at event times of a timeclock schedule, each message including a command instructing the load control device to control the electrical load according to the timeclock schedule.

10. The method of claim 1, further comprising: receiving, by the control device, a supply voltage for powering the control device via a 4 power supply connector; receiving, by the control device, a control signal indicating a power outage via the power supply connector; and operating, by the control device, in a low-power mode in response to receiving the control signal indicating the power outage.

11. The method of claim 10, further comprising: detecting the power outage in response to detecting an impedance between data terminals of the power supply connector.

12. The method of claim 1, further comprising: detecting actuation of a button at an external device; based at least in part on detecting actuation of the button, controlling the electrical load; obtaining a present time from a first message received from the external device; and based at least in part on obtaining the present time from the message received from the external device, re-synchronizing the maintained time and re-enable the timeclock schedule.

13. The method of claim 12, further comprising: storing a geographical location in the memory; obtaining a geographical location of the external device from a second message received from the external device; determining that the geographical location of the external device is the same as the geographical location stored in the memory; and based at least in part on determining that the geographical location of the external device is the same as the geographical location stored in the memory, re-enabling the timeclock schedule.

14. The method of claim 1, wherein determining that the present time is not obtainable from the server further comprises determining that a connection to the Internet is not available.

15. The method of claim 14, further comprising: illuminating a visual indicator by blinking or stroking the visual indicator when the connection to the Internet is not available.

16. The method of claim 1, further comprising: illuminating a visual indicator by blinking or stroking the visual indicator when the present time is not obtainable from the server.

17. The method of claim 1, wherein attempting to obtain a present time from a server further comprises attempting to obtain the present time from a time server via the Internet.

18. The method of claim 1, wherein disabling the timeclock schedule comprises disabling the timeclock schedule after a predetermined timeout period after determining that the present time is not obtainable from the server.

19. The method of claim 1, further comprising: receiving a control signal indicating a power outage; and operating in a low-power mode in response to receiving the control signal indicating the power outage.

\* \* \* \* \*